US012626668B2

(12) United States Patent
Bae et al.

(10) Patent No.: US 12,626,668 B2
(45) Date of Patent: May 12, 2026

(54) DATA PROCESSING METHOD AND DEVICE

(71) Applicant: Beijing Xianxin Technology Co., Ltd., Beijing (CN)

(72) Inventors: Jun Cheol Bae, Beijing (CN); Youngjin Lim, Beijing (CN); Chenghui Yan, Beijing (CN)

(73) Assignee: Beijing Xianxin Technology Co., Ltd., Beijing (CN)

( * ) Notice: Subject to any disclaimer, the term of this patent is extended or adjusted under 35 U.S.C. 154(b) by 0 days.

(21) Appl. No.: 19/080,228

(22) Filed: Mar. 14, 2025

(65) Prior Publication Data

US 2025/0246160 A1 Jul. 31, 2025

Related U.S. Application Data

(63) Continuation of application No. PCT/CN2023/119257, filed on Sep. 15, 2023.

(30) Foreign Application Priority Data

Sep. 16, 2022 (CN) .......................... 202211131139.0

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2320/064* (2013.01); *G09G 2320/0686* (2013.01)

(58) Field of Classification Search
None
See application file for complete search history.

(56) References Cited

U.S. PATENT DOCUMENTS

2010/0007670 A1* 1/2010 Song .................... G09G 3/3426 345/545
2011/0249033 A1 10/2011 Oh et al.
(Continued)

FOREIGN PATENT DOCUMENTS

CN 101847344 A 9/2010
CN 102097069 A 6/2011
(Continued)

OTHER PUBLICATIONS

Korean Office Action with English translation issued in corresponding patent application No. 10-2025-7008633 dated Sep. 19, 2025 (11 pages).
(Continued)

*Primary Examiner* — Ifedayo B Iluyomade
(74) *Attorney, Agent, or Firm* — Buchanan Ingersoll & Rooney PC

(57) ABSTRACT

A data processing method and device, where the method includes: obtaining current-frame image data and a synchronization signal of the current-frame image data, processing the current-frame image data to obtain current-frame local dimming data, and outputting the current-frame local dimming data according to the synchronization signal of the current-frame image data, wherein an output starting moment of the current-frame local dimming data is earlier than an output termination moment of the current-frame image data, and an output termination moment of the current-frame local dimming data is later than the output termination moment of the current-frame image data, so that an output time period of the current-frame local dimming data partially overlaps with an output time period of the current-frame image data. By means of this arrangement, a liquid crystal display panel and a backlight unit display data of the same frame, thereby improving the display quality.

17 Claims, 6 Drawing Sheets

(56) References Cited

U.S. PATENT DOCUMENTS

| | | | | |
|---|---|---|---|---|
| 2018/0231836 | A1* | 8/2018 | Suzuki | G02F 1/13471 |
| 2020/0152108 | A1 | 5/2020 | Chen et al. | |
| 2020/0152148 | A1 | 5/2020 | Chen et al. | |

FOREIGN PATENT DOCUMENTS

| | | | |
|---|---|---|---|
| CN | 102473391 | A | 5/2012 |
| CN | 108766364 | A | 11/2018 |
| CN | 109192149 | A | 1/2019 |
| CN | 112204647 | A | 1/2021 |
| CN | 112513968 | A | 3/2021 |
| CN | 113506545 | A | 10/2021 |
| CN | 113689832 | A | 11/2021 |
| CN | 114495855 | A | 5/2022 |
| CN | 114627826 | A | 6/2022 |
| CN | 114639353 | A | 6/2022 |
| CN | 115512665 | A | 12/2022 |
| KR | 20100012965 | A | 2/2010 |
| KR | 20219993722 | A | 1/2021 |
| TW | 201947573 | A | 12/2019 |

OTHER PUBLICATIONS

Chinese Office Action with English translation issued in corresponding Patent Application No. 202211131139.0 dated Feb. 8, 2023, 18 pages.

Chinese Notification to Grant Patent Right for Invention with English translation issued in corresponding Patent Application No. 202211131139.0 dated Feb. 28, 2023, 6 pages.

International Search Report (PCT/ISA/210) and Written Opinion (PCT/ISA/237) both with English translation mailed on Dec. 1, 2023, by the Chinese Patent Office as the International Searching Authority for International Application No. PCT/CN2023/119257, 13 pages.

* cited by examiner

DATA PROCESSING METHOD AND DEVICE

CROSS-REFERENCE TO RELATED APPLICATIONS

This application is a continuation of International Application No. PCT/CN2023/119257, filed on Sep. 15, 2023, which claims priority to Chinese Patent Application No. 202211131139.0, filed with the China National Intellectual Property Administration on Sep. 16, 2022 and entitled "DATA PROCESSING METHOD AND DEVICE", both of which are hereby incorporated by reference in their entireties.

TECHNICAL FIELD

The present application relates to the field of display technologies and, in particular, to a data processing method and device.

BACKGROUND

In a display device, in addition to a liquid crystal display (LCD for short) panel for displaying images, a light-emitting diode (LED for short) is generally used as a backlight unit (BLU for short) to enhance the display effect.

The data that controls the backlight unit to emit light is generally referred to as local dimming data, and the data that controls the liquid crystal display panel to display is referred to as image data. The local dimming data is generated based on the image data, and since the local dimming data is generally smaller than the image data, it is common to collect all the local dimming data before outputting it, so as to prevent the local dimming data from being output earlier than the image data.

Therefore, there is a delay in the output between the local dimming data and the image data, and the output delay duration is greater than the output duration of one frame of image data, which means that the backlight unit and the liquid crystal display panel display data of different frames, resulting in low display quality.

SUMMARY

The present application provides a data processing method and device, to address the technical problem of low display quality caused by a backlight unit and a liquid crystal display panel displaying data of different frames.

An embodiment of the present application provides a data processing method, and the method includes:

obtaining current-frame image data and a synchronization signal of the current-frame image data;

processing the current-frame image data to obtain current-frame local dimming data;

outputting the current-frame local dimming data according to the synchronization signal of the current-frame image data; where an output starting moment of the current-frame local dimming data is earlier than an output starting termination of the current-frame image data, and an output termination moment of the current-frame local dimming data is later than an output termination moment of the current-frame image data.

In some embodiments, the outputting the current-frame local dimming data according to the synchronization signal of the current-frame image data specifically includes:

determining an output starting moment of each local dimming sub-data according to the synchronization signal of the current-frame image data; and outputting the local dimming sub-data at the output starting moment of each local dimming sub-data;

where the current-frame local dimming data includes a plurality of local dimming sub-data, and the output starting moment of each local dimming sub-data is later than an output starting moment of pixel data corresponding to the local dimming sub-data.

In some embodiments, before outputting the current-frame local dimming data according to the synchronization signal of the current-frame image data, the method further includes:

performing filtering processing on the current-frame local dimming data, and caching the filtered current-frame local dimming data; where a caching time is less than a time required for caching all data in the current-frame local dimming data.

In some embodiments, the processing the current-frame image data to obtain the current-frame local dimming data, the performing the filtering processing on the current-frame local dimming data, and caching the filtered current-frame local dimming data specifically include:

inputting the current-frame image data into an extracting circuit, to obtain the current-frame local dimming data output by the extracting circuit;

inputting the current-frame local dimming data into a filtering circuit, to obtain the filtered current-frame local dimming data output by the filtering circuit;

inputting the filtered current-frame local dimming data into a caching circuit, to obtain the cached current-frame local dimming data output by the caching circuit.

In some embodiments, after outputting the current-frame local dimming data according to the synchronization signal of the current-frame image data, the method further includes:

controlling a backlight unit to be disconnected with a power supply terminal during a non-overlapping time period between an output time period of the current-frame local dimming data and an output time period of the current-frame image data;

controlling the backlight unit to be connected with the power supply terminal during an overlapping time period between the output time period of the current-frame local dimming data and the output time period of the current-frame image data, and driving the backlight unit according to the current-frame local dimming data.

In some embodiments, the controlling the backlight unit to be disconnected with the power supply terminal during the non-overlapping time period between the output time period of the current-frame local dimming data and the output time period of the current-frame image data specifically includes:

controlling the backlight unit to be disconnected with the power supply terminal at the output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically includes:

controlling the backlight unit to be connected with the power supply terminal at the output starting moment of the current-frame local dimming data.

In some embodiments, the controlling the backlight unit to be disconnected with the power supply terminal during the non-overlapping time period between the output time period of the current-frame local dimming data and the output time period of the current-frame image data specifically includes:

controlling the backlight unit to be disconnected with the power supply terminal at the output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically includes:

controlling the backlight unit to be connected with the power supply terminal after controlling the backlight unit to be disconnected with the power supply terminal and experiencing a delay duration; where the delay duration is an output delay duration between the output starting moment of the current-frame local dimming data and the output starting moment of the current-frame image data.

In some embodiments, the controlling the backlight unit to be connected with the power supply terminal during the overlapping time period between the output time period of the current-frame local dimming data and the output time period of the current-frame image data, and driving the backlight unit according to the current-frame local dimming data specifically includes:

controlling the backlight unit to be connected with the power supply terminal at the output starting moment of the current-frame local dimming data;

correspondingly, the controlling the backlight unit to be disconnected with the power supply terminal during the non-overlapping time period between the output time period of the current-frame local dimming data and the output time period of the current-frame image data specifically includes:

controlling the backlight unit to be disconnected with the power supply terminal after controlling the backlight unit to be connected with the power supply terminal and experiencing an overlapping duration; where the overlapping duration is a duration in which the output time period of the current-frame local dimming data overlaps the output time period of the current-frame image data.

An embodiment of the present application provides a controller, including: a processor and a memory in communication connection with the processor; where the memory stores computer-executable instructions; and the processor executes the computer-executable instructions stored in the memory, so as to implement the method involved in the above-mentioned embodiments.

An embodiment of the present application provides a display device, including a backlight unit, a source driver, a liquid crystal display panel and the controller involved in the above-mentioned embodiment.

In the data processing method and device provided in the present application, the current-frame image data and the synchronization signal of the current-frame image data are obtained, the current-frame image data is processed to obtain the current-frame local dimming data, and the current-frame local dimming data is output according to the synchronization signal of the current-frame image data, where the output starting moment of the current-frame local dimming data is earlier than the output termination moment of the current-frame image data, and the output termination moment of the current-frame local dimming data is later than the output termination moment of the current-frame image data, so that the output time period of the current-frame local dimming data partially overlaps with the output time period of the current-frame image data, so as to drive the liquid crystal display panel and the backlight unit with image data and local dimming data of a same frame, thereby improving the display quality of the display device.

BRIEF DESCRIPTION OF THE DRAWINGS

The accompanying drawings, which are incorporated herein and form part of the description, illustrate embodiments in accordance with the present application and used to explain the principles of the present application together with the description.

REFERENCE NUMERALS

100, controller; 110, extracting circuit; 120, filtering circuit; 130, caching circuit; 140, transmitting circuit; 200, LCD driver; 300, liquid crystal display panel; 400, backlight unit; 410, LED driver; 420, LED array; 202, dimming area; 201, pixel; 500, controller; 501, memory; 502, processor.

Through the above-mentioned accompanying drawings, the specific embodiments of the present application have been shown, and will be described in more detail in the following text. The accompanying drawings and text description are not intended to limit the scope of the concept of the present application in any way, but rather to describe the concept of the present application for those skilled in the art by referring to the specific embodiments.

DESCRIPTION OF EMBODIMENTS

The exemplary embodiments will be described in detail herein, and the examples thereof are illustrated in the accompanying drawings. When referring to the accompanying drawings, unless otherwise indicated, the same numbers in different drawings represent the same or similar elements. The embodiments described in the following exemplary embodiments do not represent all embodiments consistent with the present application. On the contrary, they are merely examples of apparatus and methods consistent with some aspects of the present application, as detailed in the appended claims.

Figure 1:
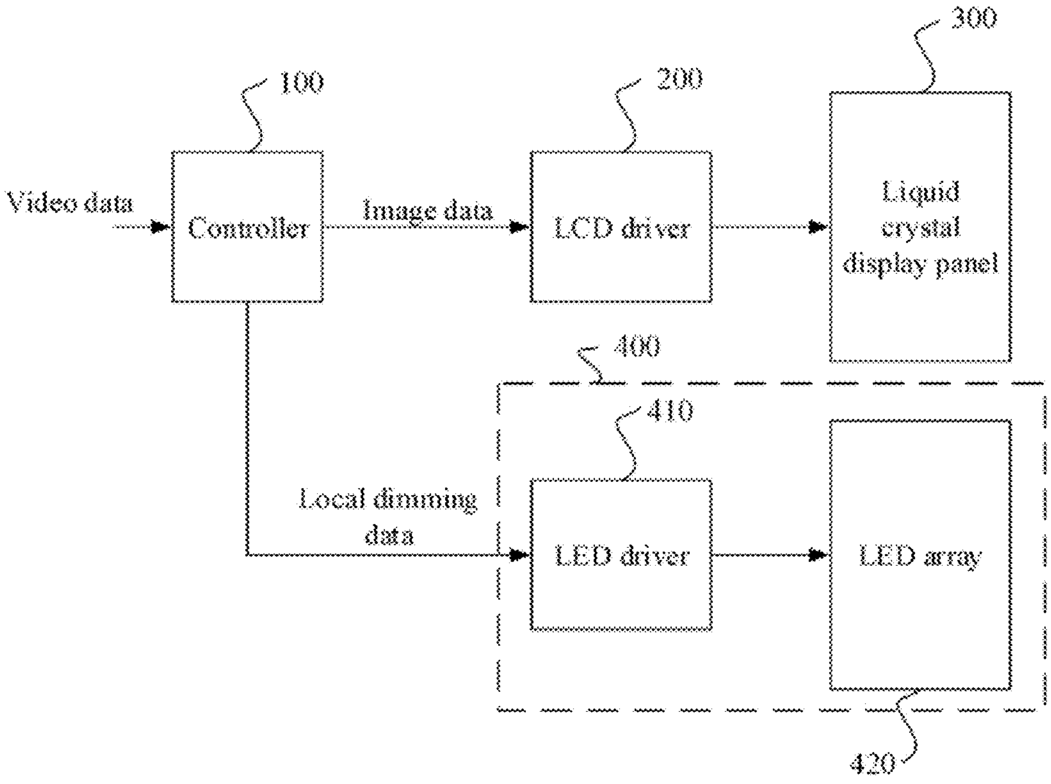
FIG. 1 is a schematic structural diagram of a display device.

As shown in FIG. 1, a display device includes a controller 100, an LCD driver 200, a liquid crystal display panel 300, and a backlight unit 400, where the backlight unit 400 includes an LED driver 410 and an LED array 420.

The controller 100 is connected with the LCD driver 200, the LCD driver 200 is connected with the liquid crystal display panel 300, the controller 100 is further connected with the LED driver 410, and the LED driver 410 is connected with the LED array 420.

The controller 100 generates image data based on video data, and the controller 100 is further configured to generate local dimming data based on the image data. The LCD driver 200 receives the image data and drives the liquid crystal display panel 300 based on the image data. The LED driver 410 receives the local dimming data and drives the LED array 420 based on the local dimming data.

Figure 2:
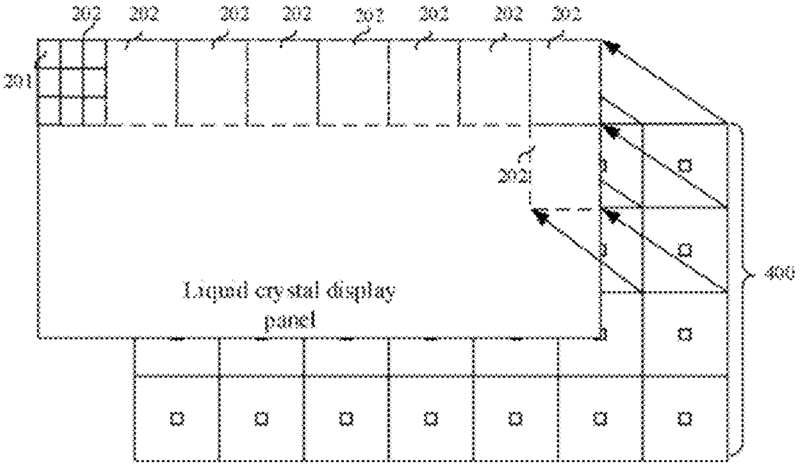
FIG. 2 is a schematic diagram of a relationship between a liquid crystal display panel and a backlight unit.

As shown in FIG. 2, the backlight unit 400 is configured to provide a backlight light source to the liquid crystal display panel 300, so as to enhance the display effect of the liquid crystal display panel 300. When the backlight unit 400 provides the backlight light source to the liquid crystal display panel 300, the liquid crystal display panel 300 may be divided into a plurality of areas, and each area includes a plurality of pixels 201. An LED light emission degree is adjusted in units of areas, and the data that controls the LED light emission degree corresponding to the area is referred to as local dimming data (Local dimming Data, LDD). Each area is referred to as a dimming area 202.

Generally, there is a difference in the output time between the image data and the local dimming data output by the controller 100. It is assumed that a duration consumed between the controller 100 receiving the video data and the controller 100 outputting the image data is denoted as $\Delta\tau 0$, and an output delay duration $\Delta\tau 3$ between an output starting moment of the local dimming data and an output starting moment of the image data is greater than an output duration of one frame of image data, and the output duration of one frame of image data is denoted as $\Delta T$.

The output time difference between the local dimming data and the image data varies depending on algorithms used to generate the local dimming data. Generally, a dimming algorithm program is stored in the controller 100 so as to enable the controller 100 to achieve the function of generating the local dimming data.

In order to generate the local dimming data rapidly and reduce the output delay duration $\Delta\tau 3$ between the output starting moment of the local dimming data and the output starting moment of the image data, a microprocessor unit (MCU for short) that executes the dimming algorithm program needs to occupy more resources. Since the resources occupied by the microprocessor unit are limited, the reduction in the output delay duration $\Delta\tau 3$ between the output starting moment of the local dimming data and the output starting moment of the image data by increasing the occupied resources is also limited.

Furthermore, compared with a data volume of the image data, a data volume of the local dimming data is relatively small, and the time required for outputting the local dimming data is less than the time required for outputting the image data. Therefore, when a part of the local dimming data is generated, such part of the local dimming data cannot be output immediately. Instead, output is performed after all the local dimming data is collected.

Therefore, considering the time required for generating the local dimming data and the time for collecting and caching all the local dimming data, the output delay duration $\Delta\tau 3$ between the output starting moment of the local dimming data and the output starting moment of the image data is generally between $1\times\Delta T$ and $2\times\Delta$.

Figure 3:
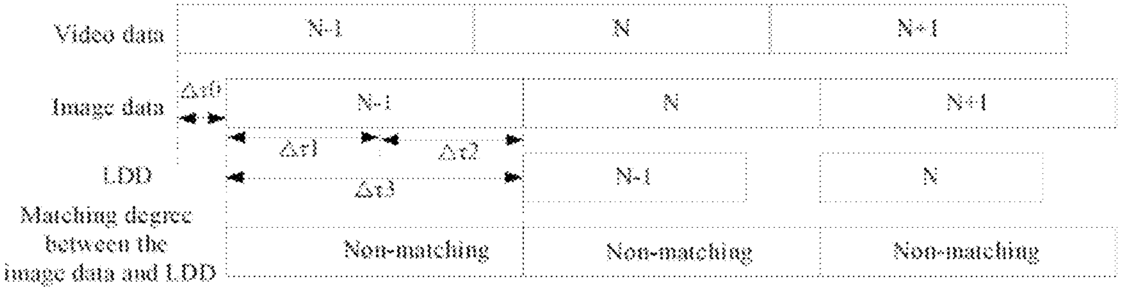
FIG. 3 is a timing relationship between local dimming data and image data.

As shown in FIG. 3, the value of the output delay duration $\Delta\tau 3$ between the output starting moment of the local dimming data and the output starting moment of the image data being $\Delta T$ is taken as an example. The controller 100 receives the video data, extracts the image data from the video data, and outputs the extracted image data. The time consumed between the controller 100 receiving the video data and the controller 100 outputting the image data is $\Delta\tau 0$. The value of the output delay duration $\Delta\tau 3$ between the output starting moment of the local dimming data and the output starting moment of the image data is $\Delta T$. The output delay duration $\Delta\tau 3$ includes a duration $\Delta\tau 1$ required for calculating the local dimming data based on the image data, and a duration $\Delta\tau 2$ required for caching the local dimming data for collecting all the local dimming data.

That is to say, when a N-th frame of image data is output, the (N−1)-th frame of local dimming data is output, and when the (N+1)-th frame of image data is output, the Nth frame of local dimming data is output. That is to say, the local dimming data output at the same time as the image data is output is the local dimming data of the previous frame, and the image data is completely mismatched with the local dimming data.

However, the display quality of the display device will be reduced when the liquid crystal display panel 300 and the backlight unit 400 display image data and local dimming data of different frames at the same time.

In order to solve the above-mentioned technical problem, the present application provides a data processing method and device, which are aimed to address the technical problem of low display quality caused by the backlight unit and the liquid crystal display panel displaying data of different frames.

Figure 4:
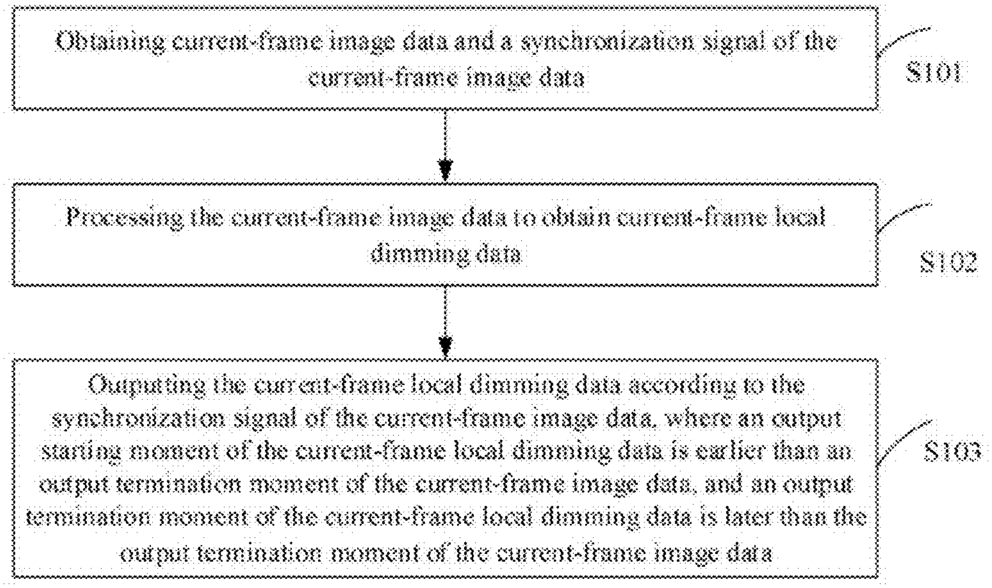
FIG. 4 is a flowchart of a data processing method according to an embodiment of the present application.

As shown in FIG. 4, an embodiment of the present application provides a data processing method, which is applied to a controller 100. The method includes the following steps.

S101, obtaining current-frame image data and a synchronization signal of the current-frame image data.

In this step, the video data is obtained, and the current-frame image data and the synchronization signal of the current-frame image data are extracted from the video data.

The synchronization signal of the current-frame image data may be a horizontal synchronization signal Hsync and/or a valid display data strobe signal DE.

S102, processing the current-frame image data to obtain current-frame local dimming data.

In this step, an extracting circuit is used to process the current-frame image data to obtain the current-frame local dimming data. The extracting circuit may be implemented through existing circuit implementations, which will not be repeated herein.

S103, outputting the current-frame local dimming data according to the synchronization signal of the current-frame image data, where an output starting moment of the current-frame local dimming data is earlier than an output termination moment of the current-frame image data, and an output termination moment of the current-frame local dimming data is later than the output termination moment of the current-frame image data.

In this step, the output starting moment t2 of the current-frame local dimming data is determined according to the synchronization signal of the current-frame image data, and the current-frame local dimming data is output at the output starting moment t2 of the current-frame local dimming data.

Figure 5:
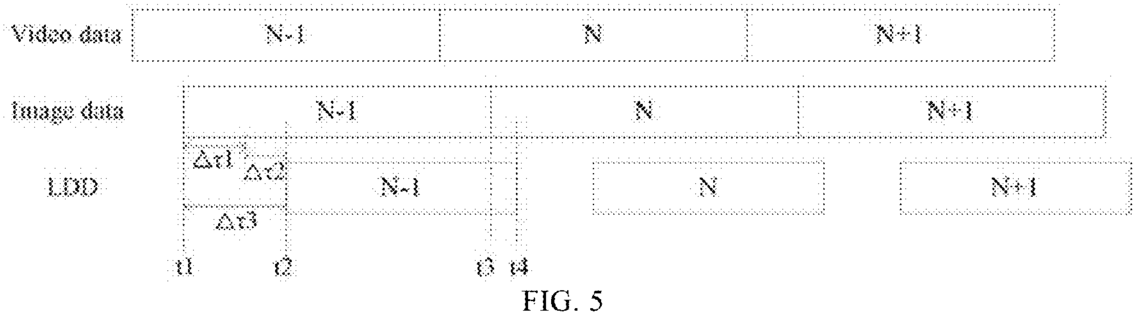
FIG. 5 shows a timing relationship between local dimming data and image data after using a data processing method according to an embodiment of the present application.

As shown in FIG. 5, when the output starting moment t2 of the current-frame local dimming data is calculated according to the synchronization signal of the current-frame image data, the output starting moment t2 of the current-frame local dimming data is made earlier than the output termination moment t3 of the current-frame image data, and the output termination time t4 of the current-frame local dimming data is made later than the output termination time t3 of the current-frame image data, so that an output time period of the current-frame local dimming data partially overlaps with an output time period of the current-frame image data.

By making the output starting moment t2 of the current-frame local dimming data earlier than the output termination moment t3 of the current-frame image data, the output delay duration Δτ3 between the output starting moment of the current-frame local dimming data and the output starting moment of the current-frame image data is reduced, so that the output delay duration Δτ3 is less than ΔT. By making the output termination time t4 of the current-frame local dimming data later than the output termination time t3 of the current-frame image data, local dimming sub-data in the current-frame local dimming data is prevent from being output earlier than pixel data corresponding to the local dimming sub-data, so that the liquid crystal display panel 300 and the backlight unit 400 are driven by image data and local dimming data of the same frame, thereby improving the display quality of the display device.

In the above-mentioned technical solution, the current-frame image data and the synchronization signal of the current-frame image data are obtained, the current-frame image data is processed to obtain the current-frame local dimming data, and the current-frame local dimming data is output according to the synchronization signal of the current-frame image data, so that the output time period of the current-frame local dimming data partially overlaps with the output time period of the current-frame image data, so as to drive the liquid crystal display panel and backlight unit with image data and local dimming data of the same frame, thereby improving the display quality of the display device.

Figure 6:
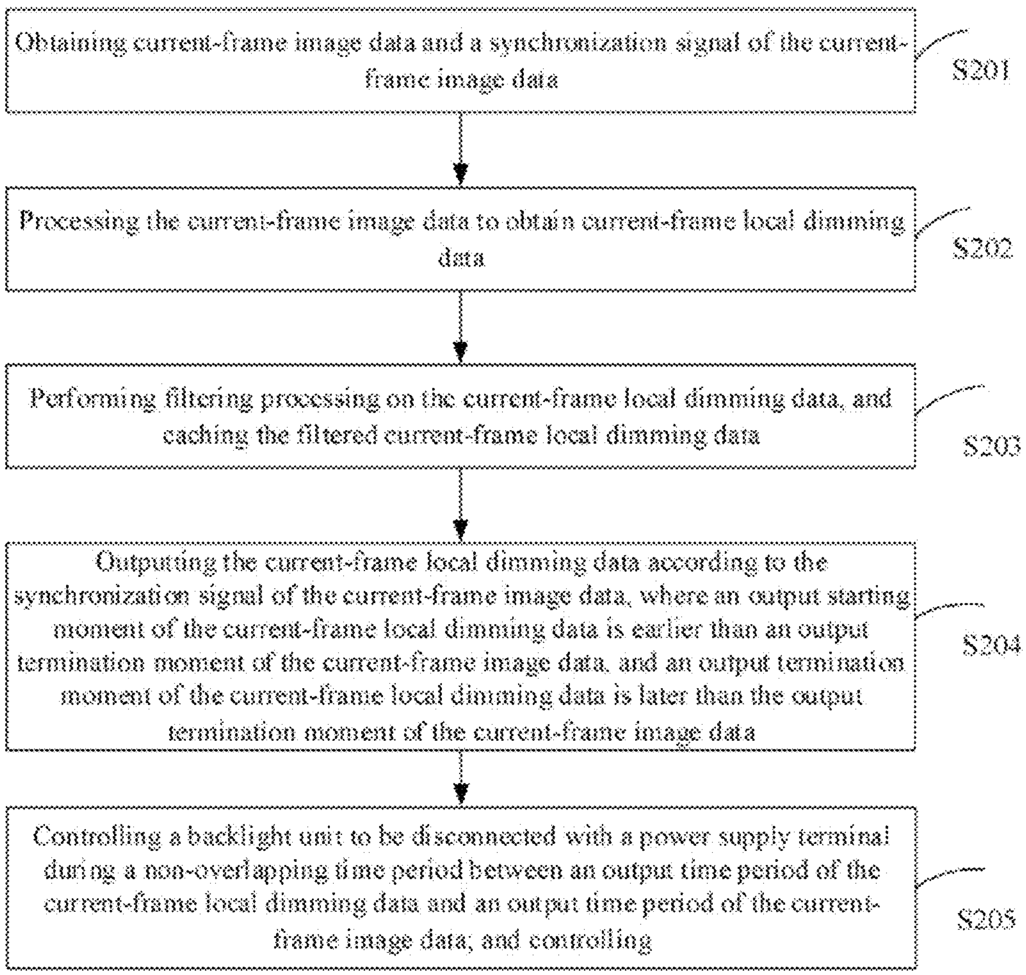
FIG. 6 is a flowchart of a data processing method according to another embodiment of the present application.
Figure 7:
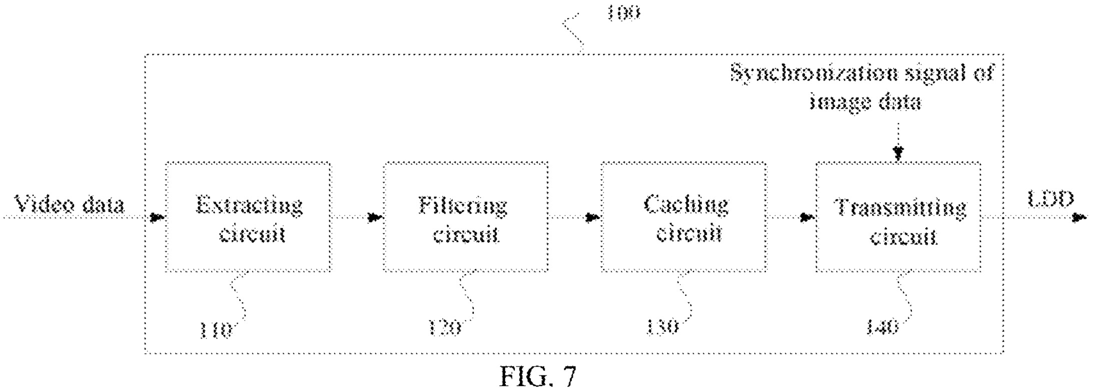
FIG. 7 is a circuit structural diagram of a controller according to an embodiment of the present application.

As shown in FIGS. 6 and 7, an embodiment of the present application provides a data processing method, which is applied to a controller 100. The method includes the following steps:

S201, obtaining current-frame image data and a synchronization signal of the current-frame image data.

S202, processing the current-frame image data to obtain current-frame local dimming data.

In this step, the current-frame image data is input into an extracting circuit 110, the current-frame image data is processed by the extracting circuit 110 to obtain the current-frame local dimming data, and the current-frame local dimming data output by the extracting circuit 110 is obtained. The extracting circuit 110 may be implemented through existing circuit implementations, which will not be repeated herein.

S203: performing filtering processing on the current-frame local dimming data, and caching the filtered current-frame local dimming data.

In this step, the current-frame local dimming data is input into a filtering circuit 120, and the filtering circuit 120 processes the current-frame local dimming data so as to obtain the filtered current-frame local dimming data output by the filtering circuit 120. The filtering circuit 120 may be implemented through existing circuit implementations, which will not be repeated herein.

The filtered current-frame local dimming data is input into a caching circuit 130, and the caching circuit 130 caches the current-frame local dimming data to obtain the current-frame local dimming data output by the caching circuit 130. The caching circuit 130 may be implemented through existing circuit implementations, which will not be repeated herein.

A caching time of the caching circuit 130 is less than a time required for caching all data in the current-frame local dimming data, that is, the caching circuit 130 immediately outputs the cached the current-frame local dimming data after caching only part of the current-frame local dimming data.

In some embodiments, the current-frame local dimming data includes a plurality of local dimming sub-data and the caching circuit 130, after continuously caching part of the current-frame local dimming data, outputs the same. For example, after caching the first local dimming sub-data and the second local dimming sub-data, the caching circuit 130 outputs the first local dimming sub-data and the second local dimming sub-data. Then the caching circuit 130 continues to cache the third local dimming sub-data and the fourth local dimming sub-data.

In the above technical solution, by outputting the cached current-frame local dimming data after only part of the current-frame local dimming data is cached, the output delay duration Δτ3 between the output starting moment of the current-frame local dimming data and the output starting moment of the current-frame image data is reduced.

Since an internal working clock is used, compared with processing the image data through the dimming algorithm program to output the local dimming data, using the extracting circuit 110 and the filtering circuit 120 to generate local dimming data makes the time required for generating the local dimming data shorter and shortens the output delay duration Δτ3 between the output starting moment of the current-frame local dimming data and the output starting moment of the current-frame image data.

In some embodiments, a better extracting circuit 110 and filtering circuit 120 may also be designed, such as a circuit with a smaller footprint or a circuit with less power consumption.

With continued reference to FIG. 5, by processing the image data through the extracting circuit 110 and the filtering circuit 120, the time Δτ1 required for generating the local dimming data is minimized, and the caching time of the caching circuit 130 is made less than the time required for caching all data in the current-frame local dimming data. The local dimming data is output before all the local dimming data has been cached, which minimizes the time Δτ2 required for caching the local dimming data and advances the time when the local dimming data is output, so that the output time of the local dimming data is close to that of the image data.

By means of this arrangement, the value of the output delay duration Δτ3 between the output starting moment of the current-frame local dimming data and the output starting moment of the current-frame image data is controlled to be less than ΔT. That is to say, the current-frame local dimming data has already started to be output before the output of the current-frame image data is completed. In this case, the output delay duration Δτ3 between the output starting moment of the current-frame local dimming data and the output starting moment of the current-frame image data is the duration Δτ1 during which the image data is extracted from the video data and the local dimming data is generated through the extracting circuit 110 and the filtering circuit 120, plus a caching time Δτ2 during which a certain amount of local dimming data is cached so as to start to output.

The output delay duration Δτ3 between the output starting moment of the current-frame local dimming data and the output starting moment of the current-frame image data cannot be shortened to zero, because the pixel data within the dimming area 202 needs to be collected in order to generate the local dimming data. In addition, the local dimming data of the dimming area 202 is generally generated by combining the pixel data in other dimming areas 202 around the dimming area 202, so more pixel data needs to be obtained so as to output the local dimming data of one dimming area 202. However, it is usually not necessary to obtain one frame of image data to generate the first local dimming data, and thus the first local dimming data can be output before the output of the current-frame image data is completed, so that the output time period of the current-frame local dimming data partially overlaps with the output time period of the current-frame image data.

S204, outputting the current-frame local dimming data according to the synchronization signal of the current-frame image data, where an output starting moment of the current-frame local dimming data is earlier than an output termination moment of the current-frame image data, and an output termination moment of the current-frame local dimming data is later than the output termination moment of the current-frame image data.

In this step, a transmitting circuit 140 receives the local dimming data output by the caching circuit 130, and also receives the synchronization signal of the image data. The transmitting circuit 140 outputs the current-frame local dimming data according to the synchronization signal of the current-frame image data.

Figure 8:
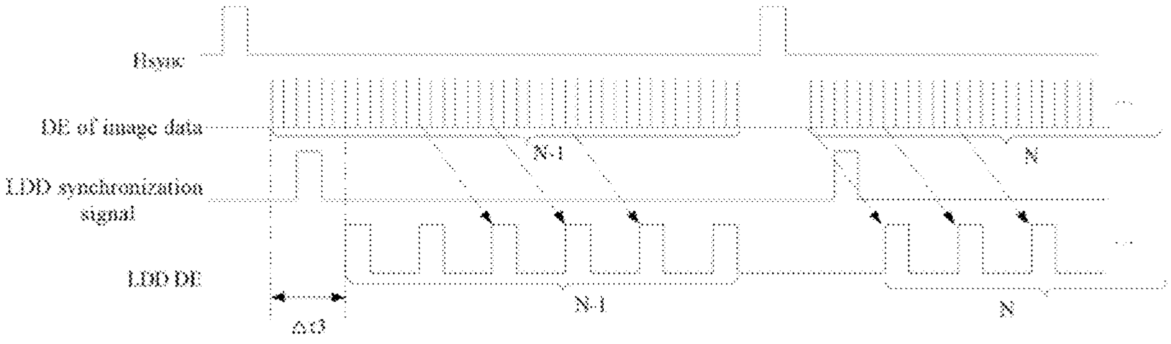
FIG. 8 is another timing relationship between local dimming data and image data after using a data processing method according to an embodiment of the present application.
Figure 9:
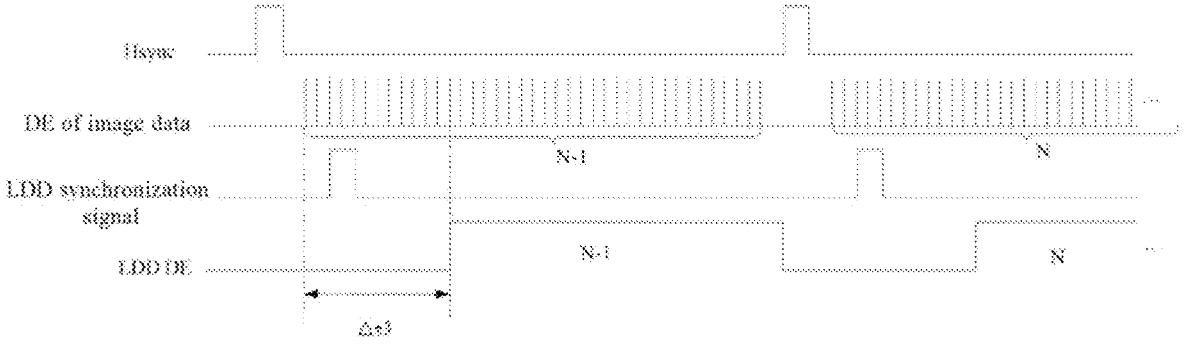
FIG. 9 is yet another timing relationship between local dimming data and image data after using a data processing method according to an embodiment of the present application.

As shown in FIGS. 8 and 9, the current-frame local dimming data includes a plurality of local dimming sub-data, and the synchronous signal of the current-frame image data is a horizontal synchronization signal Hsync and/or a plurality of valid display data strobe signals DE.

In some embodiments, the output starting moment of each local dimming sub-data is determined according to the synchronization signal of the current-frame image data. And the local dimming sub-data is output at the output starting moment of each local dimming sub-data.

The output starting moment of each local dimming sub-data is later than an output starting moment of pixel data corresponding to the local dimming sub-data. The pixel data corresponding to the local dimming sub-data refers to the pixel data in the dimming area 202 corresponding to the local dimming sub-data.

By means of this arrangement, the local dimming sub-data in the current-frame local dimming data is prevented from being output earlier than the pixel data corresponding to the local dimming sub-data, so that the local dimming sub-data and the pixel data corresponding to the local dimming sub-data are output synchronously, thereby improving the display quality of the display device.

In some embodiments, a valid display data strobe signal of the local dimming data is generated according to the synchronous signal of the current-frame image data, and the output starting moment of each local dimming sub-data is determined based on the valid display data strobe signal of the local dimming data.

Compared to outputting the current-frame local dimming data after all the current-frame image data has been output, the current-frame local dimming data is output based on the synchronization signal of the image data, so that the caching circuit 130 does not need to cache all the local dimming data and the time for caching the local dimming data is shorter, which can reduce the capacity of the caching circuit 130 or eliminate the caching circuit 130, thereby achieving that the output starting moment t2 of the local dimming data is close to the output starting moment t1 of the image data.

S205, controlling a backlight unit to be disconnected with a power supply terminal during a non-overlapping time period between an output time period of the current-frame local dimming data and an output time period of the current-frame image data; and controlling the backlight unit to be connected with the power supply terminal during an overlapping time period between the output time period of the current-frame local dimming data and the output time period of the current-frame image data, and driving the backlight unit according to the current-frame local dimming data.

In this step, the extracting circuit 110 and the filtering circuit 120 are used to shorten the time for generating the local dimming data. By reducing the capacity of the caching circuit 130 or not performing caching, the value of the output delay duration Δτ3 between the output starting moment of the current-frame local dimming data and the output starting moment of the current-frame image data is made less than ΔT.

It is ensured that there is an overlapping area between the output time of the current-frame image data and the current-frame local dimming data, that is, there is a matching interval. If the output delay duration Δτ3 between the output starting moment of the current-frame local dimming data and the output starting moment of the current-frame image data is shorter, the matching interval is longer, and the display quality of the display device is higher.

However, the output delay duration Δτ3 between the output starting moment of the current-frame local dimming data and the output starting moment of the current-frame image data will not be shortened to zero, and there still exists an interval in which the current-frame image data does not match the current-frame local dimming data.

Figure 10:
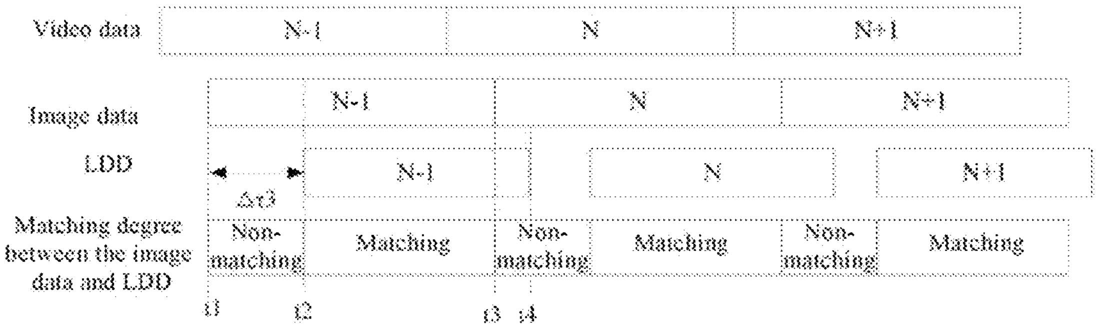
FIG. 10 is a still another timing relationship between local dimming data and image data after using a data processing method according to an embodiment of the present application.
Figure 11:
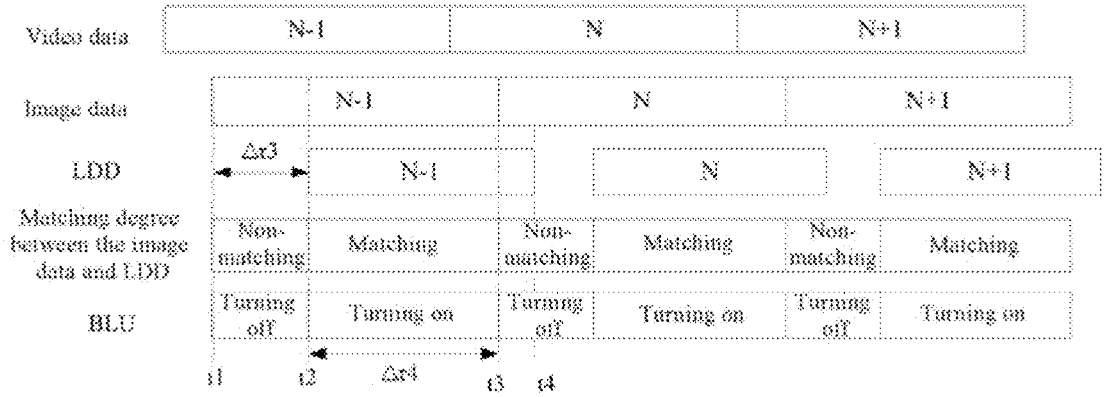
FIG. 11 is a control principle diagram of a backlight unit after using a data processing method according to an embodiment of the present application.

As shown in FIGS. 10 and 11, in order to further improve the display quality, in the non-overlapping time period between the output time period of the current-frame local dimming data and the output time period of the current-frame image data, that is, in non-matching intervals between the current-frame image data and the current-frame local dimming data, the backlight unit 400 is controlled to be disconnected with the power supply terminal, so that the backlight unit 400 is caused to stop providing the backlight light source, and only the liquid crystal display panel 300 displays in the non-matching intervals.

In the overlapping time period between the output time period of the current-frame local dimming data and the output time period of the current-frame image data, that is, in matching intervals between the current-frame local dimming data and the current-frame image data, the backlight unit 400 is controlled to be connected with the power supply terminal and is driven according to the current-frame local dimming data, so that the backlight unit 400 is caused to provide the backlight light source, and the liquid crystal display panel 300 and the backlight unit 400 simultaneously display in the matching intervals.

By making the liquid crystal display panel 300 and the backlight unit 400 simultaneously display in the matching intervals, and making the liquid crystal display panel 300 display alone in the non-matching intervals, the liquid crystal display panel 300 and the backlight unit 400 are prevented from displaying data of different frames, and the display quality is improved.

In some embodiments, the output starting moment t1 of the current-frame image data is obtained, and the backlight unit 400 is controlled to be disconnected with the power supply terminal at the output starting moment t1 of the current-frame image data. At the output starting moment t2 of the current-frame local dimming data, the backlight unit 400 is controlled to be connected with the power supply terminal.

In some embodiments, the backlight unit 400 is controlled to be disconnected with the power supply terminal at the output starting moment t1 of the current-frame image data. After the backlight unit 400 is controlled to be disconnected with the power supply terminal and an output delay duration is past, the backlight unit 400 is controlled to be connected with the power supply terminal. The output delay duration is the output delay duration Δτ3 between the output starting moment of the current-frame local dimming data and the output starting moment of the current-frame image data.

In some embodiments, the output delay duration Δτ3 is obtained by calculating the time required for generating the first local dimming sub-data and the time for the caching circuit to cache a plurality of local dimming sub-data.

In some embodiments, the backlight unit 400 is controlled to be connected with the power supply terminal at the output starting moment t2 of the current-frame local dimming data. After the backlight unit 400 is controlled to be connected with the power supply terminal and an overlapping duration is past, the backlight unit 400 is controlled to be disconnected from the power supply terminal, where the overlapping duration is the overlapping duration Δτ4 between the output time period of the current-frame local dimming data and the output time period of the current-frame image data.

In some embodiments, the output delay duration Δτ3 is calculated, and the overlapping duration Δτ4 is calculated according to the output duration of one frame of image data and the output delay duration Δτ3.

By means of this arrangement, during the non-overlapping time period between the output time period of the current-frame local dimming data and the output time period of the current-frame image data, the backlight unit 400 is controlled to be disconnected with the power supply terminal, so that the backlight unit 400 is caused to stop providing the backlight light source, and during the overlapping time period between the output time period of the current-frame local dimming data and the output time period of the current-frame image data, the backlight unit 400 is controlled to be connected with the power supply terminal and is driven according to the current-frame local dimming data, so that the backlight unit 400 is caused to provide the backlight light source.

In the above-mentioned technical solution, the extracting circuit 110 and the filtering circuit 120 are used to generate the local dimming data (which shortens the generation time for generating the local dimming data) and output the local dimming data according to the synchronization signal of the image data. After part of the local dimming data is generated, it is immediately output to reduce the data cache time. By means of this arrangement, the output delay duration Δτ3 between the output starting moment of the current-frame local dimming data and the output starting moment of the current-frame image data is reduced, so that the output time period of the current-frame local dimming data partially overlaps with the output time period of the current-frame image data. In the non-overlapping section, the backlight unit 400 is disconnected with the power supply terminal, so as to prevent the liquid crystal display panel 300 and the backlight unit 400 from displaying data of different frames, thereby improving the display quality.

Figure 12:
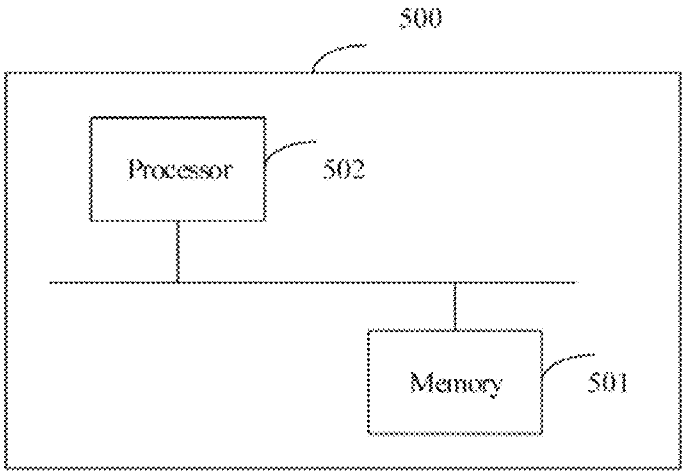
FIG. 12 is a schematic structural diagram of a controller according to an embodiment of the present application.

As shown in FIG. 12, an embodiment of the present application provides an electronic device 500. The electronic device 500 includes a memory 501 and a processor 502.

Among them, the memory 501 is configured to store computer instructions executable by the processor;

the processor 502 implements the various steps of the method in the above-mentioned embodiments when executing the computer instructions. For specific details, reference may be made to the relevant description in the above-mentioned method embodiments.

Implementation, the above-mentioned memory 501 may be independent, and may also be integrated with the processor 502. When the memory 501 is configured to be independent, the electronic device further includes a bus configured to connect the memory 501 and the processor 502.

An embodiment of the present application further provides a computer-readable storage medium, where the computer-readable storage medium stores computer instructions which, when executed by a processor, implement the various steps of the method in the above-mentioned embodiments.

An embodiment of the present application further provides a computer program product, including computer instructions, and when the computer instructions are executed by a processor, the various steps of the method in the above-mentioned embodiments is implemented.

Those skilled in the art will easily come up with other embodiments of the present application after considering the description and practicing the application disclosed herein. The present application is intended to cover any variations, uses, or adaptive changes of the present application, and these variations, uses, or adaptive changes follow the generic principles of the present application and include common general knowledge or customary technical means in the art not disclosed in the present application. The description and embodiments are only considered exemplary, and the true scope and spirit of the present application are indicated by the following claims.

It should be understood that the present application is not limited to the precise structure described above and shown in the accompanying drawings, and various modifications and changes can be made without departing from the scope thereof. The scope of the present application is limited only by the appended claims.

What is claimed is:

1. A data processing method, comprising:

obtaining current-frame image data and a synchronization signal of the current-frame image data;

processing the current-frame image data to obtain current-frame local dimming data;

outputting the current-frame local dimming data according to the synchronization signal of the current-frame image data; wherein an output starting moment of the current-frame local dimming data is earlier than an output termination moment of the current-frame image data, and an output termination moment of the current-frame local dimming data is later than the output termination moment of the current-frame image data;

wherein before outputting the current-frame local dimming data according to the synchronization signal of the current-frame image data, the method further comprises:

performing filtering processing on the current-frame local dimming data, and caching the filtered current-frame local dimming data; wherein a caching time is less than a time required for caching all data in the current-frame local dimming data.

2. The data processing method according to claim 1, wherein the outputting the current-frame local dimming data according to the synchronization signal of the current-frame image data specifically comprises:

determining an output starting moment of each local dimming sub-data according to the synchronization signal of the current-frame image data; and outputting the local dimming sub-data at the output starting moment of each local dimming sub-data;

wherein the current-frame local dimming data comprises a plurality of local dimming sub-data, and the output starting moment of each local dimming sub-data is later than an output starting moment of pixel data corresponding to the local dimming sub-data.

3. The data processing method according to claim 1, wherein the processing the current-frame image data to obtain the current-frame local dimming data, performing the filtering processing on the current-frame local dimming data, and caching the filtered current-frame local dimming data specifically comprise:

inputting the current-frame image data into an extracting circuit, to obtain the current-frame local dimming data output by the extracting circuit;

inputting the current-frame local dimming data into a filtering circuit, to obtain the filtered current-frame local dimming data output by the filtering circuit;

inputting the filtered current-frame local dimming data into a caching circuit, to obtain the cached current-frame local dimming data output by the caching circuit.

4. The data processing method according to claim 2, wherein the processing the current-frame image data to obtain the current-frame local dimming data, performing the filtering processing on the current-frame local dimming data, and caching the filtered current-frame local dimming data specifically comprise:

inputting the current-frame image data into an extracting circuit, to obtain the current-frame local dimming data output by the extracting circuit;

inputting the current-frame local dimming data into a filtering circuit, to obtain the filtered current-frame local dimming data output by the filtering circuit;

inputting the filtered current-frame local dimming data into a caching circuit, to obtain the cached current-frame local dimming data output by the caching circuit.

5. The data processing method according to claim 1, wherein after outputting the current-frame local dimming data according to the synchronization signal of the current-frame image data, the method further comprises:

controlling a backlight unit to be disconnected with a power supply terminal during a non-overlapping time period between an output time period of the current-frame local dimming data and an output time period of the current-frame image data;

controlling the backlight unit to be connected with the power supply terminal during an overlapping time period between the output time period of the current-frame local dimming data and the output time period of the current-frame image data, and driving the backlight unit according to the current-frame local dimming data.

6. The data processing method according to claim 2, wherein after outputting the current-frame local dimming data according to the synchronization signal of the current-frame image data, the method further comprises:

controlling a backlight unit to be disconnected with a power supply terminal during a non-overlapping time period between an output time period of the current-frame local dimming data and an output time period of the current-frame image data;

controlling the backlight unit to be connected with the power supply terminal during an overlapping time period between the output time period of the current-frame local dimming data and the output time period of the current-frame image data, and driving the backlight unit according to the current-frame local dimming data.

7. The data processing method according to claim 5, wherein the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal at an output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal at the output starting moment of the current-frame local dimming data.

8. The data processing method according to claim 6, wherein the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal at an output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal at the output starting moment of the current-frame local dimming data.

9. The data processing method according to claim 5, the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal at an output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal after controlling the backlight unit to be disconnected with the power supply terminal and experiencing a delay duration; wherein the delay duration refers to an output delay duration between the output starting moment of the current-frame local dimming data and the output starting moment of the current-frame image data.

10. The data processing method according to claim 6, the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal at an output starting moment of the current-frame image data;

correspondingly, the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal after controlling the backlight unit to be disconnected with the power supply terminal and experiencing a delay duration; wherein the delay duration refers to an output delay duration between the output starting moment of the current-frame local dimming data and the output starting moment of the current-frame image data.

11. The data processing method according to claim 5, wherein the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal at the output starting moment of the current-frame local dimming data;

correspondingly, the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal after controlling the backlight unit to be connected with the power supply terminal and experiencing an overlapping duration, wherein the overlapping duration is a duration in which the output time period of the current-frame local dimming data overlaps the output time period of the current-frame image data.

12. The data processing method according to claim 6, wherein the controlling the backlight unit to be connected with the power supply terminal during the overlapping time period between the output time period of the current-frame local dimming data and the output time period of the current-frame image data, and driving the backlight unit according to the current-frame local dimming data specifically comprises:

controlling the backlight unit to be connected with the power supply terminal at the output starting moment of the current-frame local dimming data;

correspondingly, the controlling the backlight unit to be disconnected with the power supply terminal during the non-overlapping time period between the output time period of the current-frame local dimming data and the output time period of the current-frame image data specifically comprises:

controlling the backlight unit to be disconnected with the power supply terminal after controlling the backlight unit to be connected with the power supply terminal and experiencing an overlapping duration, wherein the overlapping duration is a duration in which the output time period of the current-frame local dimming data overlaps the output time period of the current-frame image data.

13. A controller, comprising: a processor and a memory in communication connection with the processor; wherein the memory stores computer-executable instructions; and the processor executes the computer-executable instructions stored in the memory, so as to implement the following step:

obtaining current-frame image data and a synchronization signal of the current-frame image data;

processing the current-frame image data to obtain current-frame local dimming data;

outputting the current-frame local dimming data according to the synchronization signal of the current-frame image data; wherein an output starting moment of the current-frame local dimming data is earlier than an output termination moment of the current-frame image data, and an output termination moment of the current-frame local dimming data is later than the output termination moment of the current-frame image data;

wherein before outputting the current-frame local dimming data according to the synchronization signal of the current-frame image data, the method further comprises:

performing filtering processing on the current-frame local dimming data, and caching the filtered current-frame local dimming data; wherein a caching time is less than a time required for caching all data in the current-frame local dimming data.

14. The controller according to claim 13, wherein the outputting the current-frame local dimming data according to the synchronization signal of the current-frame image data specifically comprises:

determining an output starting moment of each local dimming sub-data according to the synchronization signal of the current-frame image data; and outputting the local dimming sub-data at the output starting moment of each local dimming sub-data;

wherein the current-frame local dimming data comprises a plurality of local dimming sub-data, and the output starting moment of each local dimming sub-data is later than an output starting moment of pixel data corresponding to the local dimming sub-data.

15. The controller according to claim 13, wherein the processing the current-frame image data to obtain the current-frame local dimming data, performing the filtering processing on the current-frame local dimming data, and caching the filtered current-frame local dimming data specifically comprise:

inputting the current-frame image data into an extracting circuit, to obtain the current-frame local dimming data output by the extracting circuit;

inputting the current-frame local dimming data into a filtering circuit, to obtain the filtered current-frame local dimming data output by the filtering circuit;

inputting the filtered current-frame local dimming data into a caching circuit, to obtain the cached current-frame local dimming data output by the caching circuit.

16. The controller according to claim 13, wherein after outputting the current-frame local dimming data according to the synchronization signal of the current-frame image data, the method further comprises:

controlling a backlight unit to be disconnected with a power supply terminal during a non-overlapping time period between an output time period of the current-frame local dimming data and an output time period of the current-frame image data;

controlling the backlight unit to be connected with the power supply terminal during an overlapping time period between the output time period of the current-frame local dimming data and the output time period of the current-frame image data, and driving the backlight unit according to the current-frame local dimming data.

17. A display device, comprising a backlight unit, a source driver, a liquid crystal display panel and the controller according to claim 13.

* * * * *